United States Patent
Bergström et al.

(10) Patent No.: US 11,064,531 B2
(45) Date of Patent: Jul. 13, 2021

(54) RANDOM ACCESS PREAMBLE SELECTION FROM MULTIPLE TYPES OF PREAMBLE GROUPS

(71) Applicant: Telefonaktiebolaget LM Ericsson (publ), Stockholm (SE)

(72) Inventors: Mattias Bergström, Sollentuna (SE); Oscar Ohlsson, Stockholm (SE); Magnus Stattin, Upplands Väsby (SE); Riikka Susitaival, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 108 days.

(21) Appl. No.: 16/483,536

(22) PCT Filed: Feb. 12, 2018

(86) PCT No.: PCT/SE2018/050125
§ 371 (c)(1),
(2) Date: Aug. 5, 2019

(87) PCT Pub. No.: WO2018/147795
PCT Pub. Date: Aug. 16, 2018

(65) Prior Publication Data
US 2020/0022187 A1 Jan. 16, 2020

Related U.S. Application Data

(60) Provisional application No. 62/457,770, filed on Feb. 10, 2017.

(51) Int. Cl.
*H04W 74/08* (2009.01)
*H04W 16/26* (2009.01)
(Continued)

(52) U.S. Cl.
CPC ....... *H04W 74/0833* (2013.01); *H04W 16/26* (2013.01); *H04W 48/16* (2013.01); *H04W 74/006* (2013.01); *H04W 74/0866* (2013.01)

(58) Field of Classification Search
CPC ....... H04W 48/16; H04W 74/002–008; H04W 74/0833; H04W 74/0866; H04L 5/005
See application file for complete search history.

(56) References Cited

U.S. PATENT DOCUMENTS

2013/0242730 A1 * 9/2013 Pelletier ............ H04W 28/0284
370/230
2014/0241297 A1 8/2014 Park et al.
(Continued)

FOREIGN PATENT DOCUMENTS

EP 2903378 A1 8/2015
KR 20120123997 A 11/2012
(Continued)

*Primary Examiner* — Kevin C. Harper
(74) *Attorney, Agent, or Firm* — Christopher & Weisberg, P.A.

(57) ABSTRACT

Random access preambles (130) are grouped in accordance with one of a plurality of grouping schemes (125). Different grouping schemes (125) are associated with different types of group selection criteria. A wireless device (110) (e.g., a user equipment) determines which one of the plurality of grouping schemes (125) the random access preambles (130) are grouped in accordance with, and selects, from among groups (135) of the random access preambles (130) as defined in accordance with the determined grouping scheme (125), a group (135) based on the type of group selection criteria associated with the determined grouping scheme (125). The wireless device (110) attempts random access to a base station (105) using a random access preamble (120) selected from the selected group (135).

19 Claims, 7 Drawing Sheets

(51) Int. Cl.
*H04W 74/00* (2009.01)
*H04W 48/16* (2009.01)

(56) References Cited

U.S. PATENT DOCUMENTS

2015/0016312 A1    1/2015  Li et al.
2019/0191466 A1*   6/2019  Xu .................... H04W 76/18

FOREIGN PATENT DOCUMENTS

KR      20160030252 A    3/2016
WO      2015005701 A1    1/2015
WO      2016047106 A1    3/2016

* cited by examiner

RANDOM ACCESS PREAMBLE SELECTION FROM MULTIPLE TYPES OF PREAMBLE GROUPS

TECHNICAL FIELD

Embodiments of the present disclosure generally relate to the technical field of wireless communications, and more particularly relate to a method of random access preamble selection performed by a wireless device and a wireless device for random access preamble selection.

BACKGROUND

In many wireless communications systems (e.g., Long Term Evolution (LTE)), a wireless device (e.g., user equipment (UE)) may need to contact the network (e.g., via an eNodeB or other base station) without having a dedicated resource in the uplink from the wireless device to the base station. To handle this, a random access procedure may be available so that the wireless device may transmit a signal to the base station, despite not having a dedicated resource in the uplink. The first message of this procedure is typically transmitted by the wireless device on a special resource reserved for random access known as a Physical Random Access Channel (PRACH). The resources available for PRACH transmission may be provided to UEs as part of broadcasted system information (or as part of dedicated RRC signaling in case of e.g. handover).

SUMMARY

Embodiments of the present disclosure include methods, systems, apparatus, computer readable mediums, and programs for random access preamble selection. According to particular embodiments, random access preambles may be grouped in accordance with one of a plurality of grouping schemes. Different grouping schemes are associated with different types of group selection criteria. A wireless device (e.g., a UE) determines which one of the plurality of grouping schemes the random access preambles are grouped in accordance with, and selects, from among groups of the random access preambles as defined in accordance with the determined grouping scheme, a group based on the type of group selection criteria associated with the determined grouping scheme. The wireless device then attempts random access to a base station using a random access preamble selected from the selected group.

For example, a first grouping scheme may be associated with a type of group selection criteria in which selection of a group is according to at least a size of a pending transmission from the wireless device, whereas a second grouping scheme may be associated with a type of group selection criteria in which selection of a group is according to a coverage enhancement level of the wireless device. Thus, the determination of how the random access preambles are grouped may, e.g., enable the wireless device to select a random access preamble from an appropriate group, among other things.

Particular embodiments of the present disclosure include a method of random access preamble selection. The method is performed by a wireless device. The method comprises determining which one of a plurality of grouping schemes random access preambles are grouped in accordance with. Different grouping schemes are associated with different types of group selection criteria. The method further comprises selecting, from among groups of the random access preambles as defined in accordance with the determined grouping scheme, a group based on the type of group selection criteria associated with the determined grouping scheme. The method further comprises attempting random access to a base station using a random access preamble selected from the selected group.

In some embodiments, the method further comprises receiving a plurality of random access preamble configuration parameters from an access node. The plurality of grouping schemes comprise first and second grouping schemes associated with respective types of group selection criteria in which selection of a group is according to at least a size of a pending transmission from the wireless device and according to a coverage enhancement level of the wireless device, respectively. Further, determining which one of the plurality of grouping schemes the random access preambles are grouped in accordance with is based on a comparison of at least two of the random access preamble configuration parameters. In some such embodiments, the comparison of the at least two of the random access preamble configuration parameters comprises comparing a sizeOfRA-PreamblesGroupA parameter against a numberOfRA-Preambles parameter. In a particular example of such an embodiment, determining which one of the plurality of grouping schemes the random access preambles are grouped in accordance with comprises determining that the random access preambles are grouped in accordance with the first grouping scheme or the second grouping scheme based respectively on whether or not the sizeOfRA-PreamblesGroupA parameter is equal to the numberOfRA-Preambles parameter.

In one or more of the above embodiments, the type of group selection criteria associated with the determined grouping scheme is based on coverage enhancement level and selecting the group based on the type of group selection criteria associated with the determined grouping scheme comprises selecting the group based on a coverage enhancement level of the wireless device. In some such embodiments, different Physical Random Access Channel (PRACH) resources are associated with different coverage enhancement levels and attempting random access to the base station using the random access preamble selected from the selected group comprises transmitting the selected random access preamble on the PRACH resource that corresponds to the group from which the random access preamble was selected.

Some such embodiments additionally or alternatively include determining which one of the plurality of grouping schemes the random access preambles are grouped in accordance with comprises determining that the random access preambles are grouped in accordance with the second grouping scheme. Further, the random access preambles in each of the groups is indicated by at least two of the plurality of random access preamble configuration parameters. In a particular example of such embodiments, the at least two of the plurality of random access preamble configuration parameters are a firstPreamble parameter and a lastPreamble parameter.

In one or more other of the above embodiments, the type of group selection criteria associated with the determined grouping scheme is based on transmission size and selecting the group based on the type of group selection criteria associated with the determined grouping scheme comprises selecting the group based on a size of a pending transmission from the wireless device.

Other embodiments of the present disclosure include a wireless device. The wireless device is configured to determine which one of a plurality of grouping schemes random access preambles are grouped in accordance with. Different grouping schemes are associated with different types of group selection criteria. The wireless device is further configured to select, from among groups of the random access preambles as defined in accordance with the determined grouping scheme, a group based on the type of group selection criteria associated with the determined grouping scheme. The wireless device is further configured to attempt random access to a base station using a random access preamble selected from the selected group.

In some embodiments, the wireless device is further configured to perform any of the methods described above.

In some embodiments, the wireless device comprises a processor and a memory, the memory containing instructions executable by the processor whereby the wireless device is configured to operate in accordance with any of the above.

In some embodiments, the radio device comprises a determining module, a selecting module, and a random access module. The determining module is configured to determine which one of the plurality of grouping schemes random access preambles are grouped in accordance with. The selecting module is configured to select, from among groups of the random access preambles as defined in accordance with the determined grouping scheme, the group based on the type of group selection criteria associated with the determined grouping scheme. The random access module is configured to attempt random access to the base station using the random access preamble selected from the selected group.

Other embodiments of the present disclosure include a computer program, comprising instructions which, when executed on at least one processor of a device, cause the at least one processor to carry out any of the methods above.

Other embodiments of the present disclosure include a carrier containing the computer program. The carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a grouping scheme 125, generally, as opposed to discussion of particular instances of illustrated grouping schemes 125a, 125b).

DETAILED DESCRIPTION

Embodiments of the present disclosure include methods, systems, apparatus, computer readable mediums, and programs for random access preamble selection. Traditionally, preambles are grouped into two groups, referred to as group A and group B. Group A preambles are typically used for smaller size packets, or larger size packets in poor radio conditions. Group B preambles are typically used for larger size packets in good radio conditions. By selecting a preamble from an appropriate group and sending this preamble to a base station, a wireless device may help the base station to calculate the resources needed by the wireless device to transmit on the uplink.

According to embodiments of the present disclosure, random access preambles may be grouped in accordance with one of a plurality of grouping schemes, with different grouping schemes being associated with different types of group selection criteria. A wireless device (e.g., a UE) determines which one of the plurality of grouping schemes the random access preambles are grouped in accordance with, and selects, from among groups of the random access preambles as defined in accordance with the determined grouping scheme, a group based on the type of group selection criteria associated with the determined grouping scheme. The wireless device then attempts random access to a base station using a random access preamble selected from the selected group.

Figure 1:
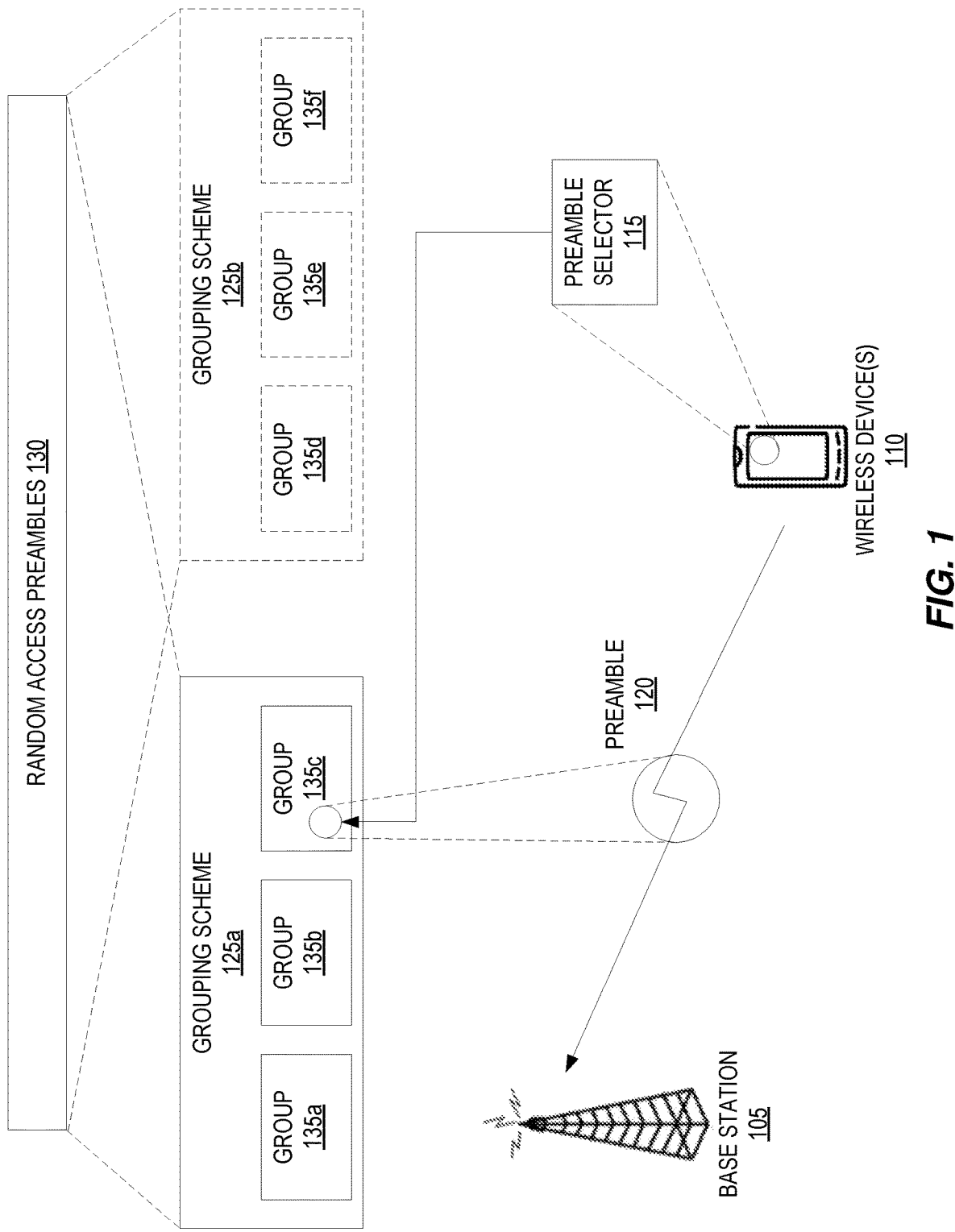
FIG. 1 is a block diagram illustrating random access preamble selection according to one or more embodiments of the present disclosure.

FIG. 1 illustrates random access preamble selection according to one or more embodiments of the present disclosure. In this example, the random access preamble selection is performed by a wireless device 110, which uses the selected random access preamble 120 to attempt random access to a base station 105 (e.g., an access node of a communication network). According to this example, the random access preamble 120 is selected from preamble group 135c, which is one of a plurality of preamble groups 135a-c grouped in accordance with a grouping scheme 125a. The grouping scheme 125a is one of a plurality of grouping schemes 125a-b in which the random access preambles 130 may be grouped. Although the random access preambles 130 are grouped in accordance with grouping scheme 125a in this example, other embodiments may be grouped in accordance with the grouping scheme 125b (which would have its own preamble groups 135d-f) and/or one or more other grouping schemes (not shown).

Each of the grouping schemes 125a-b is associated with a different type of group selection criteria that the wireless device 110 may use to select an appropriate preamble group 135. For example, grouping scheme 125a may be associated with a type of group selection criteria in which selection of a group 135 is according to a size of a pending transmission from the wireless device 110 and/or an amount of path loss detected by the wireless device 110, whereas grouping scheme 125b may be associated with a type of group selection criteria in which selection of a group 135 is according to a coverage enhancement level of the wireless device.

For example, the grouping scheme 125a may be associated with a type of group selection criteria for selecting between groups 135a and 135b in which selection of group 135a is performed when the size of the pending transmission from the wireless device 110 is greater than the threshold messageSizeGroupA and path loss detected by the wireless device 110 is less than the threshold $P_{CMAX,C}$. Alternatively, the preambles in preamble groups 135a-c (i.e., when the random access preambles 130 are grouped in accordance with grouping scheme 125a) may be purposed for use when the wireless device 110 has small, medium, and large pending transmissions, respectively. Other embodiments include grouping schemes 125 associated with other types of group selection criteria, and may include any number of corresponding groups 135.

As another example, the preambles in preamble groups 135d-f (i.e., when the random access preambles 130 are grouped in accordance with grouping scheme 125b) may be purposed for use when the wireless device 110 is in respective enhanced coverage enhancement levels. Other embodiments include one or more grouping schemes 125 that are different or in addition to the above.

Taking coverage enhancement as an example, such is typically achieved through various forms of repetition and retransmission, allowing for energy accumulation at the receiving side in both downlink and uplink. The amount of repetition of the physical signals and channels transmitted to and from the wireless terminal 110 may be optimized with respect to the wireless terminal's coverage situation (with more repetitions in bad coverage situations than in good coverage situations). A wireless device 110 may be in enhanced coverage because it is outside the normal range of base station 105. Typically, a wireless device 110 indicates the required amount of coverage enhancement (i.e., its "coverage enhancement level") to the base station 105 during random access. According to embodiments, the selection of a preamble 120 from an appropriate preamble group 135d-f grouped in accordance with coverage enhancement level selection criteria and included in a random access transmission to the base station 105 may provide this indication to the base station 105.

That is, the base station 105 may be able to identify the coverage enhancement level of the wireless device 110 from the preamble 120 the wireless device 110 has selected, in view of how the preambles 130 are grouped. Similarly, selection of the preamble 120 from a preamble group 135a-c grouped in accordance with transmission size selection criteria and included in a random access transmission to the base station 105 may provide the base station 105 with an indication of a size of a pending transmission from the wireless device 110. As shown in FIG. 1, a preamble selector 115 of the wireless device 110 selects the preamble 120.

Significantly, in some embodiments, grouping the preambles 130 according to grouping scheme 125a interferes with the use of groups 135d-f of the other type. Additionally or alternatively, grouping the preambles 130 according to grouping scheme 125b interferes with the use of groups 135a-c. For example, if the difference in amount of data to be transmitted is indicated by selection of a preamble from one of the groups 135a-c, coverage enhancement level cannot be selected and/or indicated, as the random access preambles 130 are not grouped in accordance with grouping scheme 125b. Accordingly, the wireless device 110 may select preamble 120 based on a determination of which one of the plurality of grouping schemes 125a-b the random access preambles 130 are grouped in accordance with.

Other embodiments may group the preambles 130 in other ways. For example, other embodiments may include co-existing grouping schemes 125. In some such embodiments, one portion of the preambles 130 are grouped according to a first grouping scheme 125a and a different portion of the preambles 130 are grouped according to a second grouping scheme 125b. In some such embodiments, the preambles 130 of the different portions may be mutually disjoint. In some other embodiments, the preambles 130 of the different portions may intersect. Thus, the principles described herein may be applied to different arrangements of the preambles 130 of any complexity according to various embodiments.

Determining which one of the plurality of grouping schemes 125a-b the random access preambles 130 are grouped in accordance with may be performed in a variety of ways, depending on the particular embodiment. In one particular example, this determination is based on a comparison between the parameters sizeOfRA-PreamblesGroupA and numberOfRA-Preambles.

In particular, the wireless device 110 may determine that Random Access preambles group B exists if sizeOfRA-PreamblesGroupA is not equal to numberOfRA-Preambles. If Random Access preambles group B does not exist (e.g., because sizeOfRA-PreamblesGroupA is equal to numberOfRA-Preambles), the wireless device 110 may determine that a type of preamble group exists where each group is associated with different coverage enhancements levels.

An example of how the above can be implemented in the LTE MAC specification is as follows:

If sizeOfRA-PreamblesGroupA is not equal to numberOfRA-Preambles:

Random Access Preambles group B exists and is calculated as above;

else:

the preambles that are contained in Random Access Preambles group for each enhanced coverage level, if it exists, are the preambles firstPreamble to lastPreamble.

In the above example, the wireless device 110 determines whether the number of preambles in a Random Access Preambles group A is smaller than a value indicating the number of preambles (e.g., the number of non-dedicated preambles in particular). If this is the case the wireless device 110 determines that a Random Access Preambles group B exists. If not, then the wireless device 110 determines that there exists a Random Access Preambles group for each existing enhanced coverage level instead.

Figure 2:
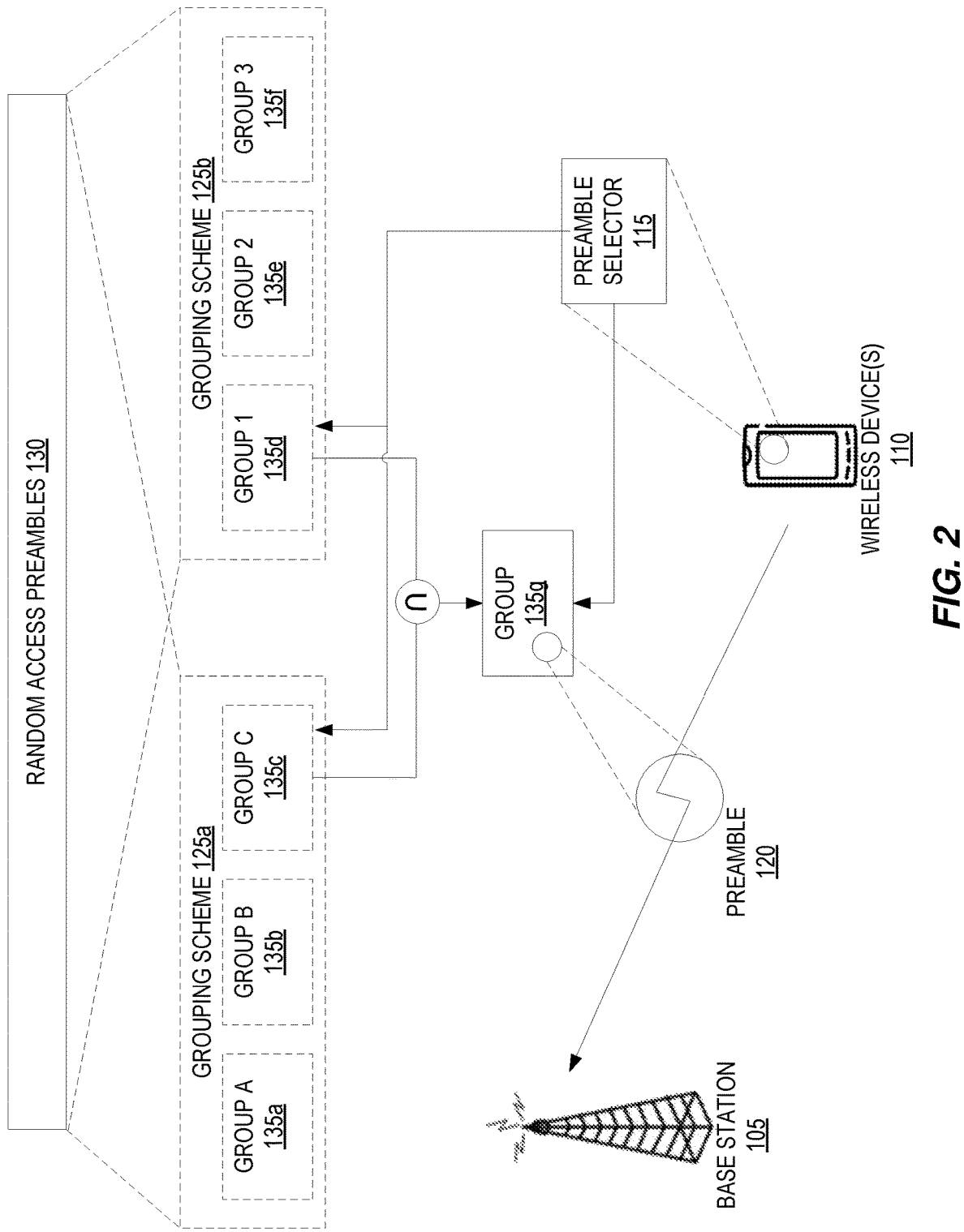
FIG. 2 is a block diagram illustrating random access preamble selection according to one or more further embodiments of the present disclosure.

Alternatively, as shown in FIG. 2, the wireless device 110 may select a preamble from a group of preambles 135g determined to be the intersection of a first group 135c as defined according to a first grouping scheme 125a, and a second group 135d as defined according to a second grouping scheme 125b. In some embodiments, this may allow the wireless device 110 to avoid having to determine which one of the plurality of grouping schemes 125a-b the random access preambles 130 are grouped in accordance with, i.e., by selecting a preamble 120 that would be appropriate under either grouping scheme 125a-b.

That is, according to embodiments, the wireless device 110 selects a group 135c of preambles from which a preamble 120 is to be selected when a Random Access preamble transmission is to be performed. The wireless device 110 will perform a first selection of a first group of preambles from a first type of preamble groups, e.g. select between groups 135a-c where each of these groups are grouped according of a type in accordance with grouping scheme 125a. The wireless device 110 will also perform a second selection of a second group of preambles from a second type of preamble groups, e.g., select between groups 135d-f where each of these groups are grouped according to a type in accordance with grouping scheme 125b. In some embodiments, the grouping scheme 125a may be associated with a pending transmission size, and the grouping scheme 125b may be associated with a coverage enhancement level. The selection from each of the groups 135c-d may be in any order.

The wireless device 110 determines a group 135g of preambles that are the intersection of preambles from group 135c and group 135d, and performs a preamble transmission using a preamble 120 selected from the determined group 135g.

The wireless device 110 may select the preamble 120 in order to participate in a random access procedure that enables the wireless device 110 to transmit a signal to the base station 105 despite lacking a dedicated resource in the uplink from the wireless device 110 to the base station 105. The first message of this procedure may be transmitted by the wireless device on a special resource reserved for random access known as a Physical Random Access Channel (PRACH). The resources available for PRACH transmission may be provided to the wireless device 110 as part of broadcasted system information (or as part of dedicated RRC signaling in case of handover, for example). Such a procedure may be used in a variety of communication systems supporting wireless communication, including (for example) LTE, among others.

Radio communication between the base station 105 and the wireless device 110 may be performed using radio resources across a time and/or frequency domain. Different communication systems support different bandwidths and/or time frames. For example, LTE generally supports a transmit and receive bandwidth of up to 20 MHz and uses 10 ms radio frames. The frequency domain supports a plurality of subcarriers. Radio frames are divided into (typically) 10 equally-sized subframes, each of which includes two slots. Resources of the frequency and time domain may be aggregated into physical resource blocks (PRBs). A typical PRB is 12 subcarriers wide and 1 slot long.

Rel-13 of LTE introduces battery life, device cost/complexity, and coverage optimizations for machine type communications (MTC). MTC devices (e.g., wireless device 110, in some embodiments) can sometimes be placed in challenging locations, for which LTE network rollouts were not dimensioned for full coverage. For example, smart meters are often placed in building basements and are sometime even contained in metal enclosures; similarly, in smart agriculture use cases, devices may be located in rural and isolated areas.

Device cost/complexity reduction may be achieved through various techniques. One important technique introduced in LTE Rel-13 involves reducing the UE transmit and receive bandwidth from 20 MHz to 1.4 MHz. The reduced bandwidth means that the wireless device 110 will have fewer physical resource blocks per resource available on which to transmit or receive (e.g., up to 6 physical resource blocks (PRBs) at 180 kHz each, instead of up to 100 PRBs as typical in LTE).

Figure 3:
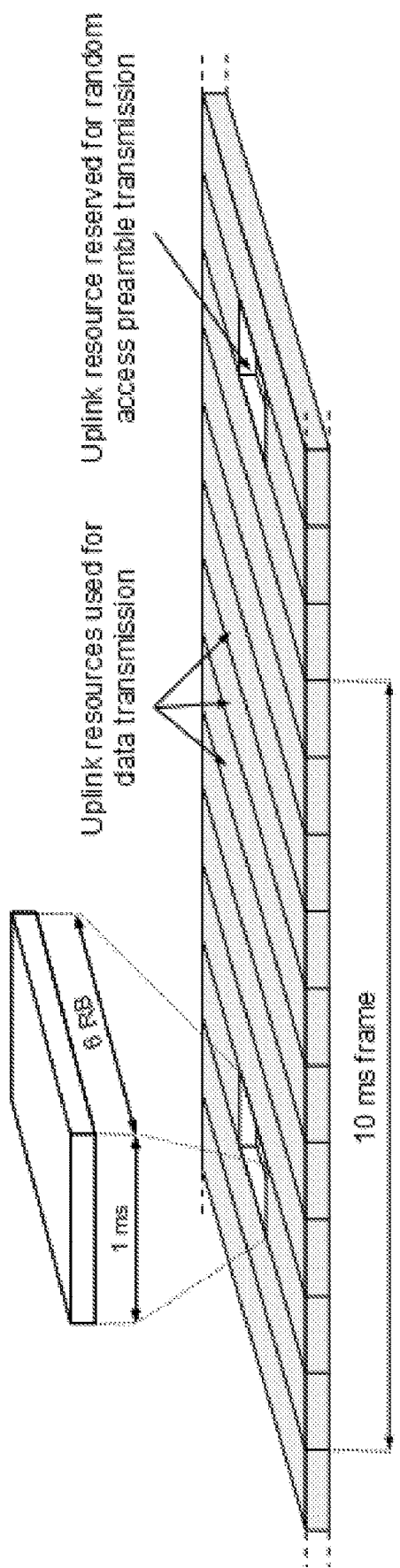
FIG. 3 is a block diagram illustrating resources of an uplink, according to one or more embodiments of the present disclosure.

FIG. 3 illustrates transmission resources on an uplink supporting transmission of the selected preamble 120 from the wireless device 110 to the base station 105, in accordance with various embodiments of the present disclosure, e.g., as part of a random access procedure. As shown, the uplink is structured with radio frames that are 10 ms long, each radio frame including ten subframes that are each 1 ms long. Resources of this particular uplink are allocated in units that are six PRB wide and one subframe long. Some of the resources are used for data transmission, whereas others are reserved for random access preamble transmission (e.g., sometimes called a PRACH resource).

In some embodiments, the wireless device 110 may learn which resource is reserved for random access preamble transmission through a system information broadcast from the base station 105. In some embodiments, separate PRACH resources are used for different coverage enhancement levels. That is, the wireless device 110 may select a PRACH resource that corresponds to its coverage enhancement level. In some such embodiments, transmitting the preamble 120 on a particular PRACH resource may indicate to the base station 105 the coverage enhancement level of the wireless device 110.

The random access procedure may be used for a number of different reasons. Such reasons may include, for example, initial access (e.g., when the wireless device 110 is in LTE_IDLE or LTE_DETACHED states), incoming handover, resynchronization of the uplink, scheduling request (e.g., when the wireless device 110 is not allocated any other resource for contacting the base station 105), and/or positioning.

Figure 4:
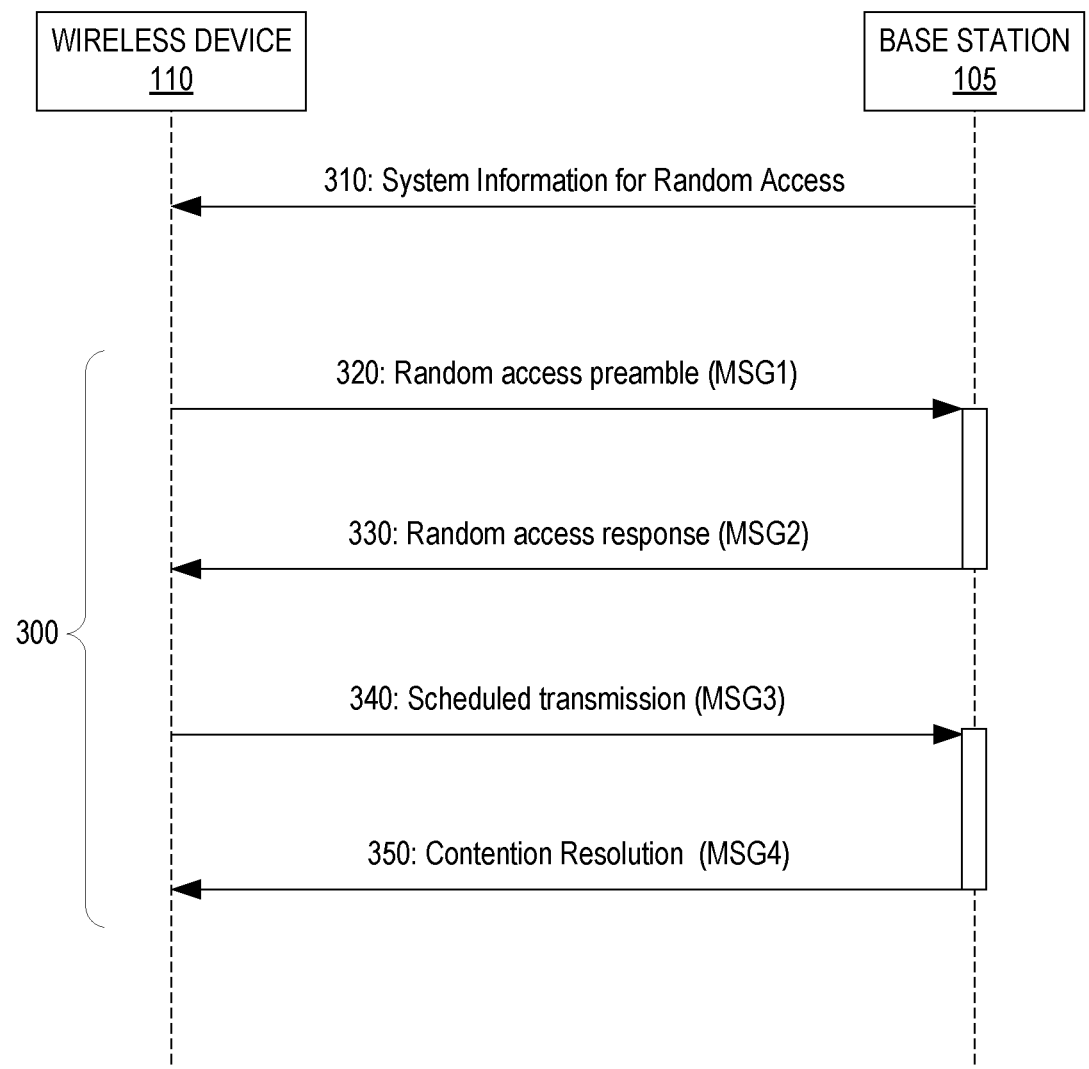
FIG. 4 is a signaling diagram illustrating signals exchanged between a wireless device and a base station in support of a random access procedure, according to one or more embodiments of the present disclosure.

A contention-based random access procedure 300 used in LTE is illustrated in FIG. 4. The wireless device 110 starts the random access procedure 300 by randomly selecting one of the preambles 130 available for contention-based random access, and transmitting the selected random access preamble 120 in MSG1 on the physical random access channel (PRACH) to the base station 105 (step 320). As discussed above, the wireless device 110 may learn of the resource reserved for random access preamble transmission from an earlier system information broadcast from the base station 105 (step 310).

The base station 105 acknowledges the preamble 120 by transmitting a random access response (MSG2) including the preamble 120, an initial grant to be used on the uplink shared channel, a Temporary Cell Radio Network Temporary Identifier (TC-RNTI), and a time alignment (TA) update based on the timing offset of the preamble 120 measured by the base station 105 on the PRACH (step 330). The MSG2 is transmitted in the downlink to the wireless device 110.

When receiving the response the wireless device 110 uses the grant to transmit a message (MSG3) that in part is used to trigger the establishment of radio resource control and in part to uniquely identify the wireless device 110 on the common channels of the cell. The timing alignment command provided in the random access response is applied in the uplink transmission in MSG3 (step 340). The base station 105 may change the resources blocks that are assigned for a MSG3 transmission by sending an uplink grant that is scrambled with the TC-RNTI.

MSG4 (which is for contention resolution) has its PDCCH scrambled with a C-RNTI if one has been previously assigned to the wireless device 110. Otherwise, the PDCCH is scrambled with the TC-RNTI. The procedure ends with the base station 105 solving any preamble contention that may have occurred (i.e., in the case of multiple wireless devices 110 transmitting the same preamble at the same time). This can occur since each wireless device 110 randomly selects when to transmit and which preamble 120 to use. If multiple wireless devices 110 use the same preamble 120 for the transmission on the PRACH, there will be contention that needs to be resolved through the contention resolution message (MSG4).

In some embodiments, it is beneficially ensured that the wireless device 110 selects a preamble 120 associated with the current coverage enhancement level even when the wireless device 110 retransmits MSG3. This may avoid Random Access failures which in its turn may reduce the number of radio link failures. Some embodiments additionally or alternatively beneficially enable the configuration of both Random Access Preambles grouped according to traditional A/B groupings, as well as configuration of Random Access Preambles groups associated with different coverage enhancements levels.

Figure 5:
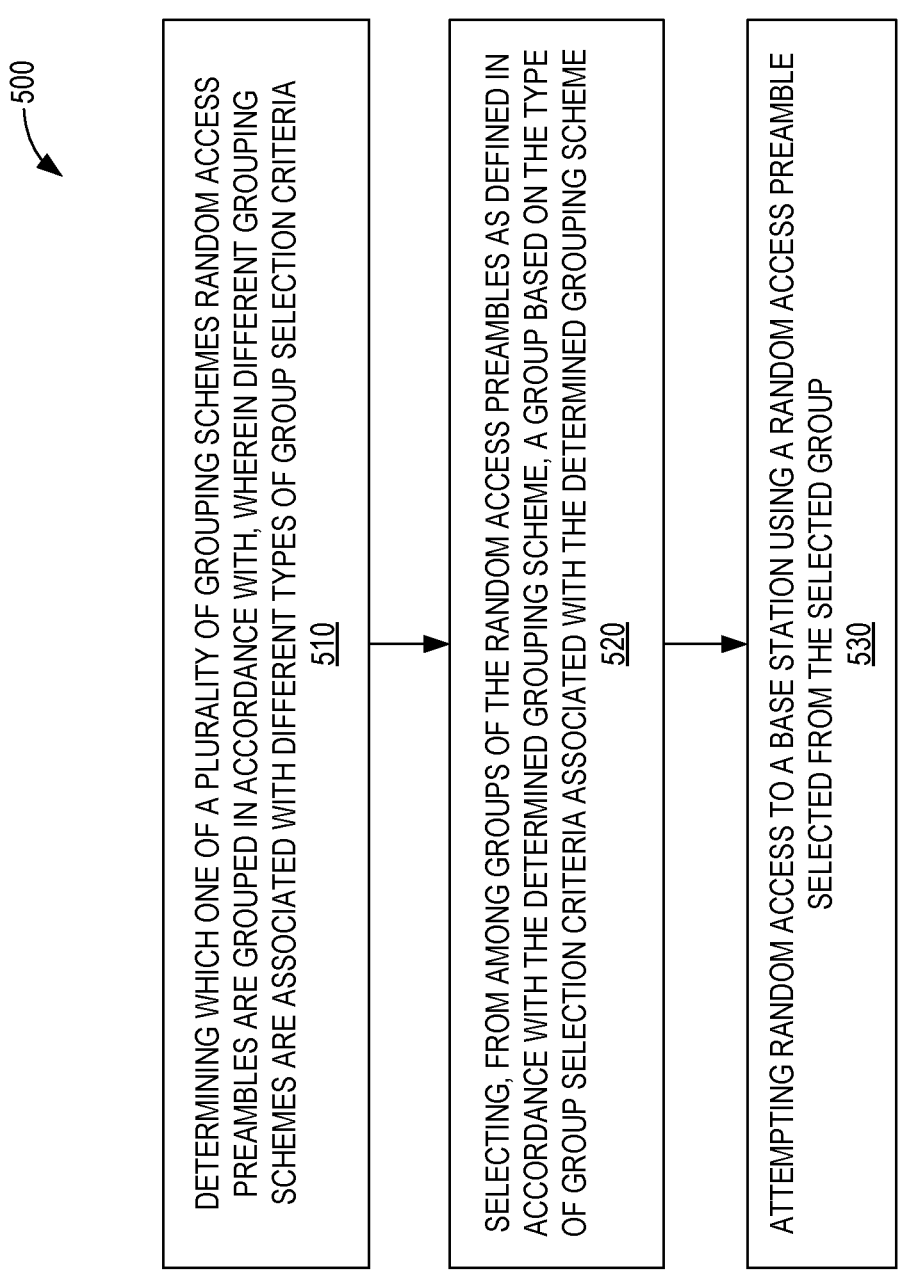
FIG. 5 is a flowchart illustrating an example method according to one or more further embodiments of the present disclosure.

With reference to FIG. 1, FIG. 5 illustrates an example method 500 of random access preamble selection performed by a wireless device 110. The method 500 comprises determining which one of a plurality of grouping schemes 125 random access preambles 130 are grouped in accordance with (block 510). The different grouping schemes 125 are associated with different types of group selection criteria. The method 500 further comprises selecting, from among groups 135 of the random access preambles 130 as defined in accordance with the determined grouping scheme 125, a group 135 based on the type of group selection criteria associated with the determined grouping scheme 125 (block 520). The method 500 further comprises attempting random access to a base station 105 using a random access preamble 120 selected from the selected group 135 (block 530).

Figure 6:
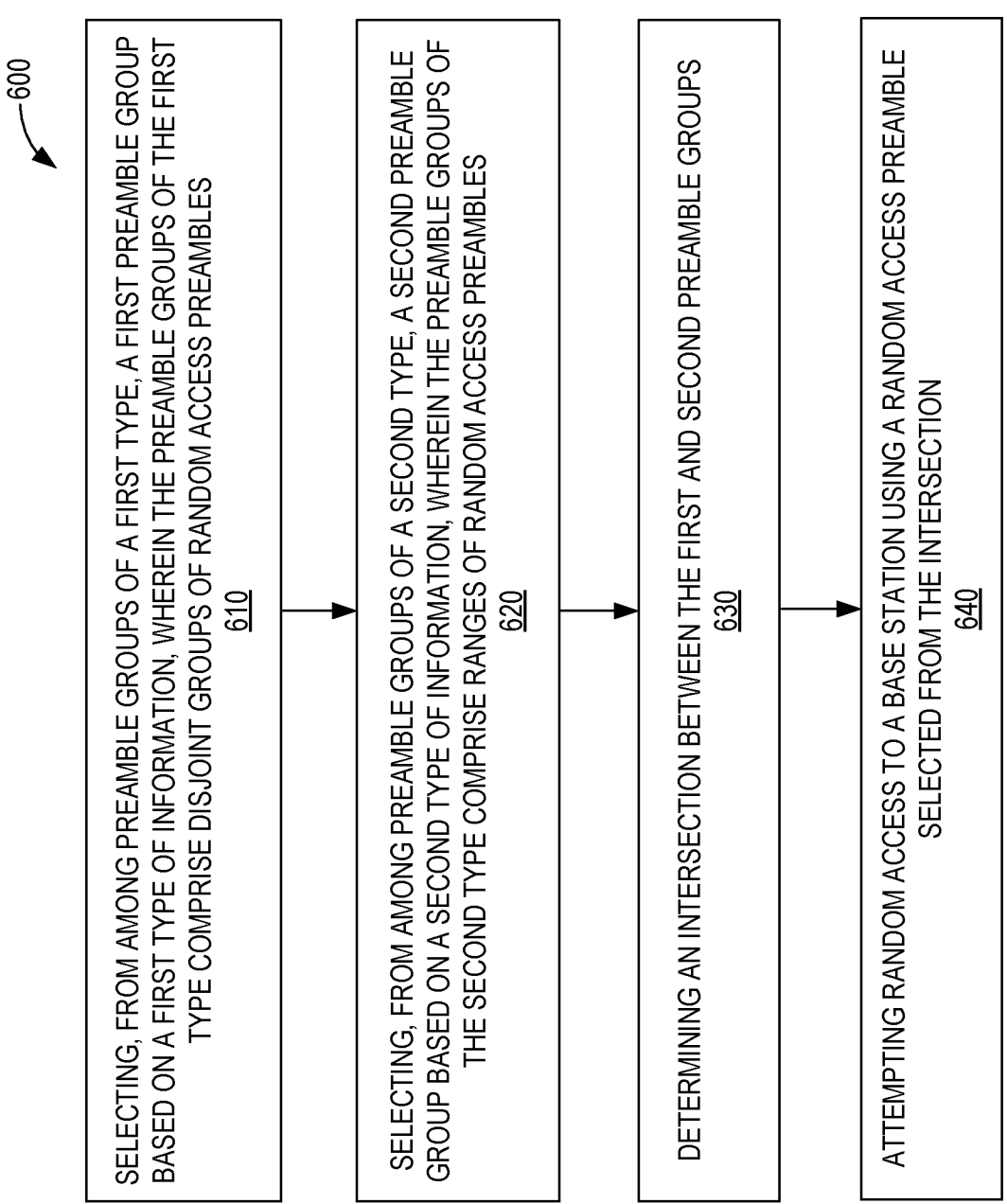
FIG. 6 is a flowchart illustrating another example method according to one or more further embodiments of the present disclosure.
Figure 9:
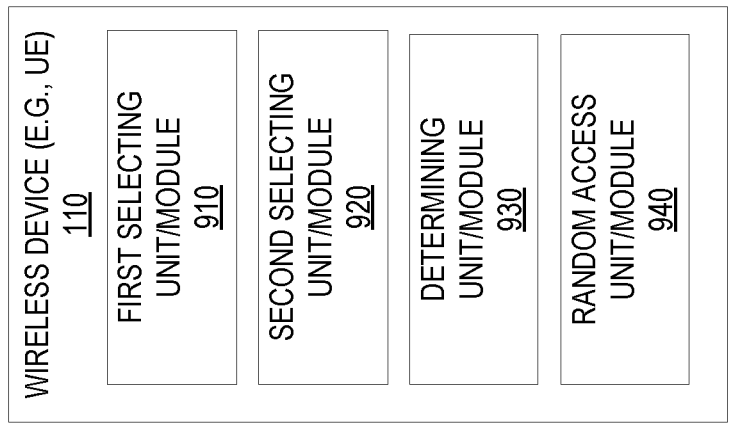
FIG. 9 is a block diagram illustrating yet another example wireless device according to one or more further embodiments of the present disclosure.

With reference to FIG. 2, FIG. 6 illustrates another example method 600 of random access preamble selection performed by a wireless device 110. The method 600 comprises selecting, from among preamble groups 135a-c of a first type, a first preamble group 135c based on a first type of information (block 610). The preamble groups 135a-c of the first type comprise disjoint groups of random access preambles 130. The method 600 further comprises selecting, from among preamble groups 135d-f of a second type, a second preamble group 135d based on a second type of information (block 620). The preamble groups 135d-f of the second type comprise ranges of random access preambles 130. The method 600 further comprises determining an intersection 135g between the first and second preamble groups 135c-d (block 630), and attempting random access to a base station 105 using a random access preamble 120 selected from the intersection 135g (block 640).

Note that a wireless device 110 (e.g., a UE) as described above may perform the methods in FIGS. 5 and/or 6 and any other processing herein by implementing any functional means or units. In one embodiment, for example, the network node comprises respective circuits or circuitry configured to perform the steps shown in FIGS. 5 and/or 6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 7:
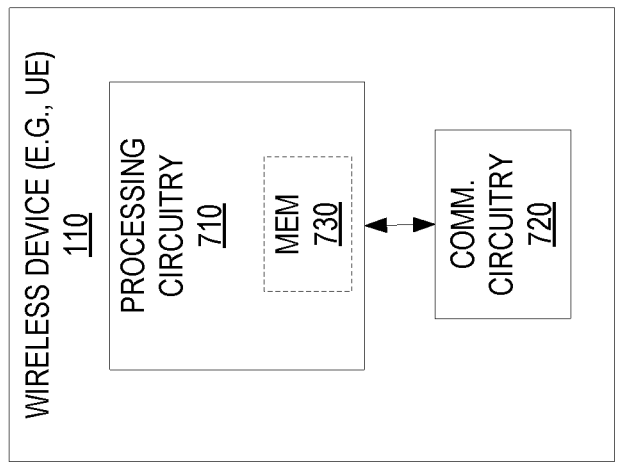
FIG. 7 is a block diagram illustrating an example wireless device according to one or more further embodiments of the present disclosure.

FIG. 7 illustrates a wireless device 110 implemented in accordance with one or more embodiments. As shown, the wireless device 110 includes processing circuitry 710 and communication circuitry 720. The communication circuitry 720 is configured to transmit and/or receive information to and/or from a base station 105, e.g., via any communication technology. Such communication may occur via one or more antennas that are either internal or external to the wireless device 110. The processing circuitry 710 is configured to perform processing described above, e.g., in FIGS. 5 and/or 6, such as by executing instructions stored in memory 730. The processing circuitry 710 in this regard may implement certain functional means, units, or modules.

Figure 8:
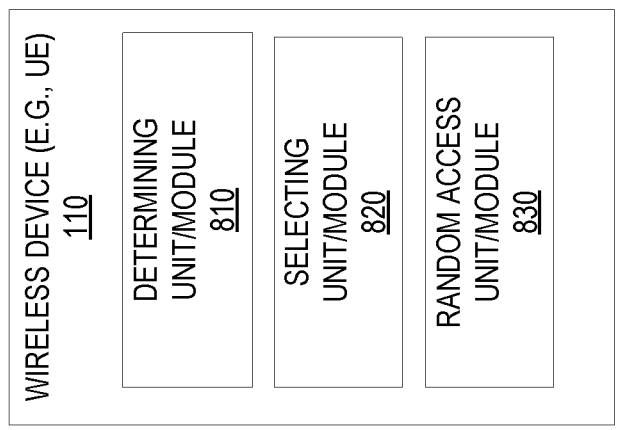
FIG. 8 is a block diagram illustrating another example wireless device according to one or more further embodiments of the present disclosure.

FIG. 8 illustrates a wireless device 110 implemented in accordance with one or more other embodiments. As shown, the wireless device 110 implements various functional means, units, or modules, e.g., via the processing circuitry 710 in FIG. 7 and/or via software code. These functional means, units, or modules, e.g., for implementing the method in FIG. 5, include (for instance) a determining unit or module 810 determining which one of a plurality of grouping schemes 125 random access preambles 130 are grouped in accordance with, wherein different grouping schemes 125 are associated with different types of group selection criteria. Also included is a selecting unit or module 820 for selecting, from among groups of the random access preambles 135 as defined in accordance with the determined grouping scheme 125, a group 135 based on the type of group selection criteria associated with the determined grouping scheme 125. Also included is a random access unit or module 830 for attempting random access to a base station 105 using a random access preamble 120 selected from the selected group 135.

FIG. 7 illustrates a wireless device 110 implemented in accordance with one or more other embodiments. As shown, the wireless device 110 implements various functional means, units, or modules, e.g., via the processing circuitry 710 in FIG. 7 and/or via software code. These functional means, units, or modules, e.g., for implementing the method in FIG. 6, include (for instance) a first selecting unit or module 910 for selecting, from among preamble groups 135a-c of a first type, a first preamble group 135c based on a first type of information. The preamble groups 135a-c of the first type comprise disjoint groups of random access preambles 130. Also included is a second selecting unit or module 920 for selecting, from among preamble groups 135d-f of a second type, a second preamble group 135d based on a second type of information. The preamble groups 135d-f of the second type comprise ranges of random access preambles 130. Also included is a determining unit or module 930 determining an intersection 135g between the first and second preamble groups 135c-d. Also included is a random access unit or module 940 for attempting random access to a base station 105 using a random access preamble 120 selected from the intersection 135g.

Those skilled in the art will also appreciate that embodiments herein further include corresponding computer programs.

A computer program comprises instructions which, when executed on at least one processor of a wireless device 110, cause the wireless device 110 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

Note that a wireless device 110 as described herein may be any type of node capable of communicating wirelessly with a base station 105, e.g., over radio signals. A wireless device 110 may therefore refer to a user equipment (UE), a machine-to-machine (M2M) device, a machine-type communications (MTC) device, a NB-IoT device, etc. It should be noted that a "UE" does not necessarily have a "user" in the sense of an individual person owning and/or operating the device. A wireless device 110 may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an internet of things (IoT) scenario, a wireless device 110 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Other embodiments of the present disclosure may additionally or alternatively include aspects of the examples detailed in the enumerated embodiments below. Further embodiments of the present disclosure may additionally or alternatively include aspects of the examples detailed in the appendices below.

Those skilled in the art will appreciate that the various methods and processes described herein may be implemented using various hardware configurations that generally, but not necessarily, include the use of one or more microprocessors, microcontrollers, digital signal processors, or the like, coupled to memory storing software instructions or data for carrying out the techniques described herein. For instance, one or more of the processing functionalities discussed above may be implemented using dedicated hardware, rather than a microprocessor configured with program instructions. Such variations, and the engineering tradeoffs associated with each, will be readily appreciated by the skilled practitioner. Since the design and cost tradeoffs for the various hardware approaches, which may depend on system-level requirements that are outside the scope of the present disclosure, are well known to those of ordinary skill in the art, further details of specific hardware implementations are not provided herein.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

The invention claimed is:

1. A method of random access preamble selection, performed by a wireless device, the method comprising:
    determining which one of a plurality of grouping schemes a plurality of groups of random access preambles are all grouped in accordance with, wherein different grouping schemes are associated with different types of group selection criteria, the plurality of grouping schemes comprising first and second grouping schemes associated with respective types of group selection criteria in which selection of a group is according to at least a size of a pending transmission from the wireless device and according to a coverage enhancement level of the wireless device, respectively;
    selecting, from among the groups of random access preambles as defined in accordance with the determined grouping scheme, a group based on the type of group selection criteria associated with the determined grouping scheme;
    attempting random access to a base station using a random access preamble selected from the selected group;
    receiving a plurality of random access preamble configuration parameters from an access node; and
    determining which one of the plurality of grouping schemes the plurality of groups of random access preambles are all grouped in accordance with being based on a comparison of at least two of the random access preamble configuration parameters.

2. The method of claim 1, wherein the comparison of the at least two of the random access preamble configuration parameters comprises comparing a sizeOfRA-PreamblesGroupA parameter against a numberOfRA-Preambles parameter.

3. The method of claim 2, wherein determining which one of the plurality of grouping schemes the plurality of groups of random access preambles are all grouped in accordance with comprises determining that the random access preambles of a group are grouped in accordance with the first grouping scheme or the second grouping scheme based respectively on whether or not the sizeOfRA-PreamblesGroupA parameter is equal to the numberOfRA-Preambles parameter.

4. The method of claim 1, wherein the type of group selection criteria associated with the determined grouping scheme is based on coverage enhancement level and selecting the group based on the type of group selection criteria associated with the determined grouping scheme comprises selecting the group based on a coverage enhancement level of the wireless device.

5. The method of claim 4, wherein different Physical Random Access Channel (PRACH) resources are associated with different coverage enhancement levels and attempting random access to the base station using the random access preamble selected from the selected group comprises transmitting the selected random access preamble on the PRACH resource that corresponds to the group from which the random access preamble was selected.

6. The method of claim 4, further comprising receiving a plurality of random access preamble configuration parameters from an access node, and wherein:
determining which one of the plurality of grouping schemes the plurality of groups of random access preambles are all grouped in accordance with comprises determining that the random access preambles of each group are grouped in accordance with the second grouping scheme; the random access preambles in each of the groups is indicated by at least two of the plurality of random access preamble configuration parameters.

7. The method of claim 6, wherein the at least two of the plurality of random access preamble configuration parameters are a firstPreamble parameter and a lastPreamble parameter.

8. The method of claim 1, wherein the type of group selection criteria associated with the determined grouping scheme is based on transmission size and selecting the group based on the type of group selection criteria associated with the determined grouping scheme comprises selecting the group based on a size of a pending transmission from the wireless device.

9. The method of claim 1, wherein the plurality of grouping schemes comprise first and second grouping schemes associated with respective types of group selection criteria in which selection of a group is according to a size of a pending transmission from the wireless device and according to a coverage enhancement level of the wireless device, respectively.

10. A wireless device comprising:
a processor and a memory, the memory containing instructions executable by the processor whereby the wireless device is configured to:
determine which one of a plurality of grouping schemes a plurality of groups of random access preambles are all grouped in accordance with, wherein different grouping schemes are associated with different types of group selection criteria, the plurality of grouping schemes comprising first and second grouping schemes associated with respective types of group selection criteria in which selection of a group is according to at least a size of a pending transmission from the wireless device and according to a coverage enhancement level of the wireless device, respectively;
select, from among groups of the random access preambles as defined in accordance with the determined grouping scheme, a group based on the type of group selection criteria associated with the determined grouping scheme;
attempt random access to a base station using a random access preamble selected from the selected group
receive a plurality of random access preamble configuration parameters from an access node; and
the wireless device being configured to determine which one of the plurality of grouping schemes the plurality of groups of random access preambles are all grouped in accordance with based on a comparison of at least two of the random access preamble configuration parameters.

11. The wireless device of claim 10, wherein to compare the at least two of the random access preamble configuration parameters, the wireless device is configured to compare a sizeOfRA-PreamblesGroupA parameter against a numberOfRA-Preambles parameter.

12. The wireless device of claim 11, wherein to determine which one of the plurality of grouping schemes the plurality of groups of random access preambles are all grouped in accordance with, the wireless device is configured to determine that the random access preambles of a group are grouped in accordance with the first grouping scheme or the second grouping scheme based respectively on whether or not the sizeOfRA-PreamblesGroupA parameter is equal to the numberOfRA-Preambles parameter.

13. The wireless device of claim 10, wherein the type of group selection criteria associated with the determined grouping scheme is based on coverage enhancement level and to select the group based on the type of group selection criteria associated with the determined grouping scheme, the wireless device is configured to select the group based on a coverage enhancement level of the wireless device.

14. The wireless device of claim 13, wherein different Physical Random Access Channel (PRACH) resources are associated with different coverage enhancement levels and to attempt random access to the base station using the random access preamble selected from the selected group, the wireless device is configured to transmit the selected random access preamble on the PRACH resource that corresponds to the group from which the random access preamble was selected.

15. The wireless device of claim 13, further configured to receive a plurality of random access preamble configuration parameters from an access node, and wherein: to determine which one of the plurality of grouping schemes the plurality of groups of random access preambles are all grouped in accordance with, the wireless device is configured to determine that the random access preambles of each group are grouped in accordance with the second grouping scheme; the random access preambles in each of the groups is indicated by at least two of the plurality of random access preamble configuration parameters.

16. The wireless device of claim 15, wherein the at least two of the plurality of random access preamble configuration parameters are a firstPreamble parameter and a lastPreamble parameter.

17. The wireless device of claim 10, wherein the type of group selection criteria associated with the determined grouping scheme is based on transmission size and to select the group based on the type of group selection criteria associated with the determined grouping scheme, the wireless device is configured to select the group based on a size of a pending transmission from the wireless device.

18. The wireless device of claim 10, wherein the plurality of grouping schemes comprise first and second grouping schemes associated with respective types of group selection criteria in which selection of a group is according to a size of a pending transmission from the wireless device and according to a coverage enhancement level of the wireless device, respectively.

19. A non-transitory computer readable medium storing a computer program product for controlling a programmable wireless device, the computer program product comprising software instructions that, when run on the programmable wireless device, cause the programmable wireless device to:
determine which one of a plurality of grouping schemes a plurality of groups of random access preambles are all grouped in accordance with, wherein different grouping schemes are associated with different types of group selection criteria, the plurality of grouping schemes comprising first and second grouping schemes associated with respective types of group selection criteria in which selection of a group is according to at least a size of a pending transmission from the wireless device and according to a coverage enhancement level of the wireless device, respectively;

select, from among the groups of random access preambles as defined in accordance with the determined grouping scheme, a group based on the type of group selection criteria associated with the determined grouping scheme;

attempt random access to a base station using a random access preamble selected from the selected group; and receive a plurality of random access preamble configuration parameters from an access node; and the wireless device being configured to determine which one of the plurality of grouping schemes the plurality of groups of random access preambles are all grouped in accordance with based on a comparison of at least two of the random access preamble configuration parameters.

\* \* \* \* \*